United States Patent [19]

Schramm

[11] Patent Number: 4,616,977
[45] Date of Patent: Oct. 14, 1986

[54] HUBLESS, HINGELESS AND BEARINGLESS HELICOPTER ROTOR SYSTEM

[76] Inventor: Buford J. Schramm, 1330 E. Fremont Dr., Tempe, Ariz. 85281

[21] Appl. No.: 529,942

[22] Filed: Sep. 7, 1983

Related U.S. Application Data

[63] Continuation-in-part of Ser. No. 340,774, Jan. 19, 1982, Pat. No. 4,403,918, which is a continuation-in-part of Ser. No. 26,653, Apr. 23, 1979, Pat. No. 4,316,700.

[51] Int. Cl.⁴ .............................................. B64C 27/38
[52] U.S. Cl. ................................ 416/138; 416/134 A; 416/141; 416/226
[58] Field of Search ............... 416/134 A, 138 A, 141, 416/230 A, 226, 144

[56] References Cited

U.S. PATENT DOCUMENTS

| | | | |
|---|---|---|---|
| 2,757,745 | 8/1956 | Verhage et al. | 416/138 A |
| 3,533,714 | 10/1970 | Pfleiderer | 416/144 |
| 3,950,115 | 4/1976 | Euler | 416/226 |
| 3,962,506 | 6/1976 | Dunahoo | 428/158 |
| 4,111,605 | 9/1978 | Roman et al. | 416/141 |
| 4,201,515 | 5/1980 | Derschmidt et al. | 416/134 A |
| 4,213,739 | 7/1980 | Euler et al. | 416/226 |
| 4,273,511 | 6/1981 | Mouille et al. | 416/134 A |
| 4,292,009 | 9/1981 | Weiland et al. | 416/134 A |
| 4,344,739 | 8/1982 | Derschmidt et al. | 416/141 |
| 4,352,631 | 10/1982 | Buchs et al. | 416/134 A |

FOREIGN PATENT DOCUMENTS 2521363  12/1975  Fed. Rep. of Germany ...... 416/226

Primary Examiner—Everette A. Powell, Jr.
Attorney, Agent, or Firm—Donald D. Mon

[57] ABSTRACT

A helicopter rotor system in which a plurality of rotor blades are attached to the rotor mast. Each blade has a spar formed of fibers bundled and bonded together inside a skin. These fibers are divided into two bundles, each of which has a bight with a bend and two arms that double back into the spar. The bights are joined to the mast by spaced-apart attachments. The attachments may be plate-like, and can be shaped to provide initial coning and camber angles.

19 Claims, 25 Drawing Figures

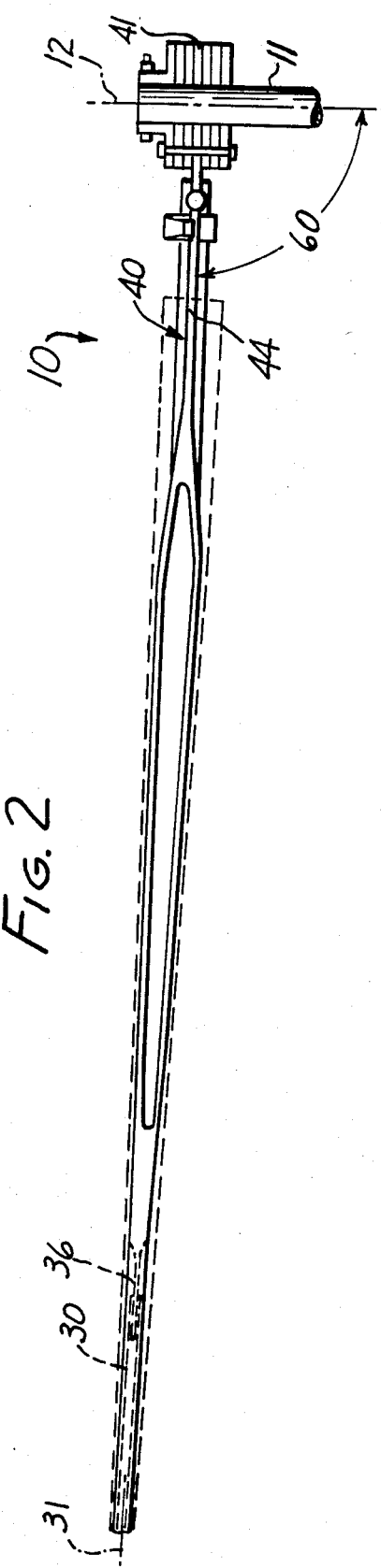

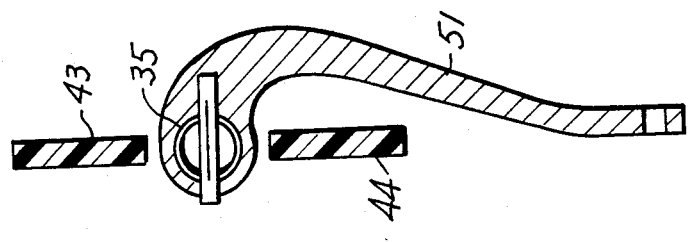
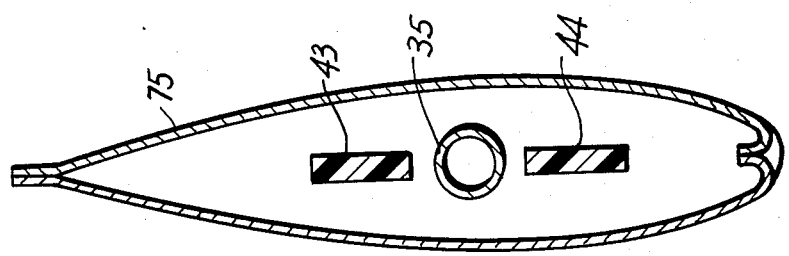
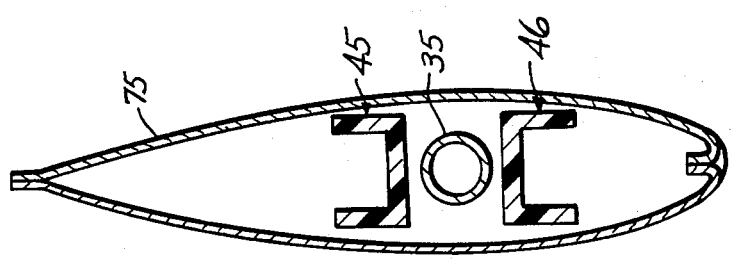
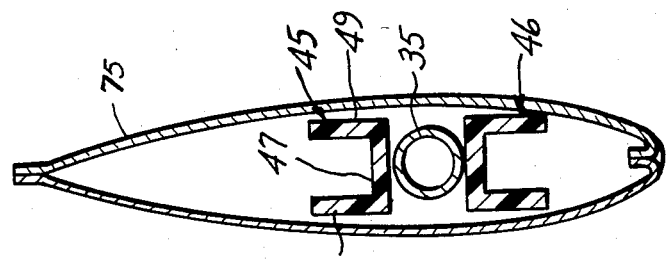
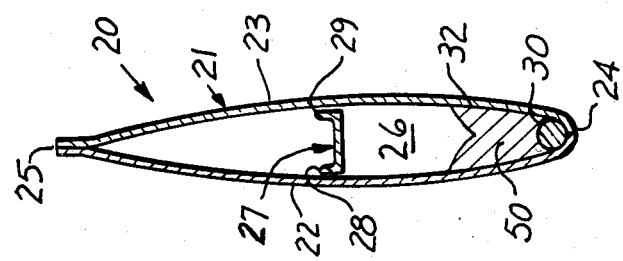

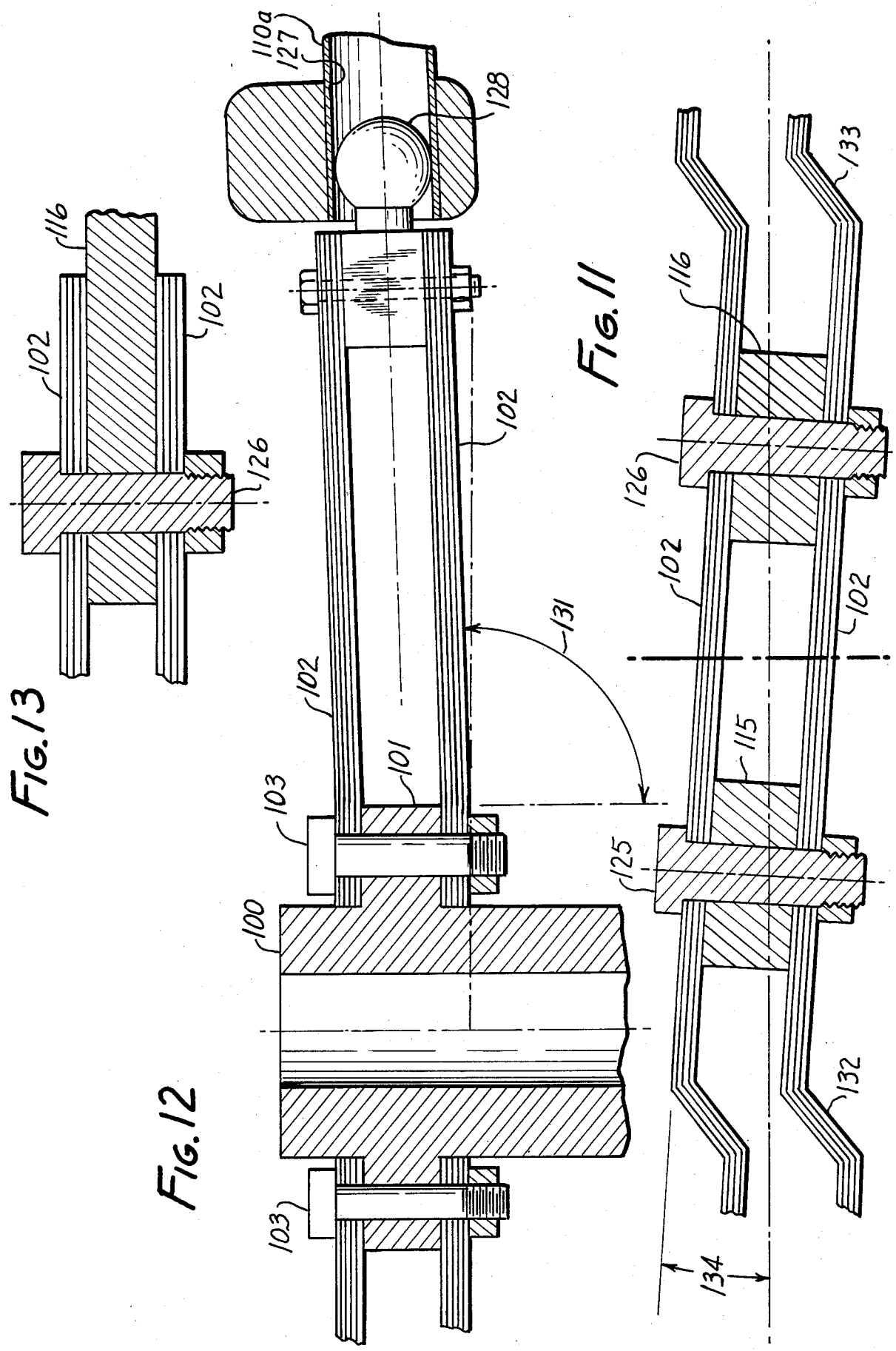

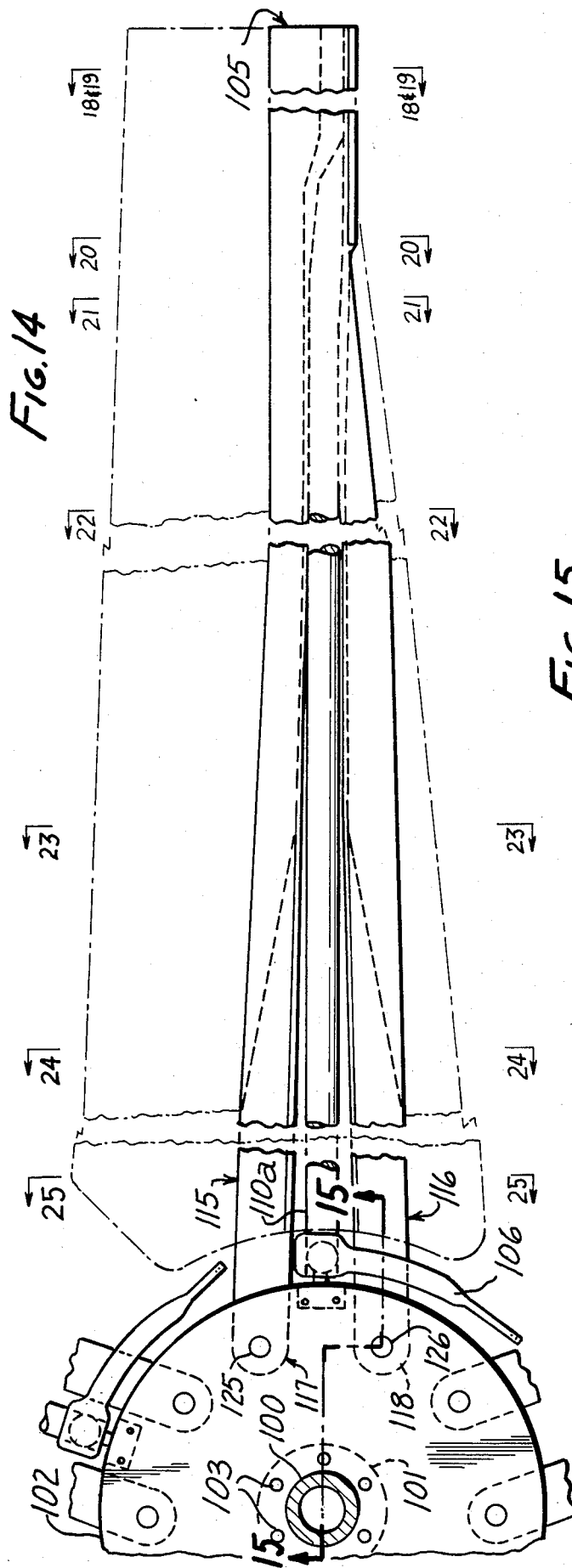
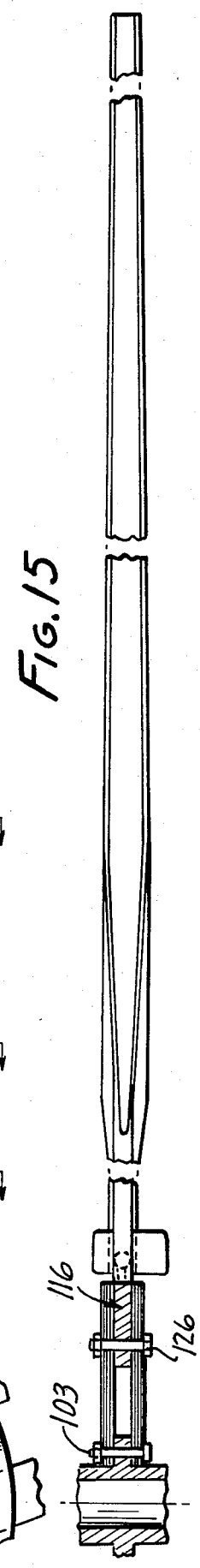
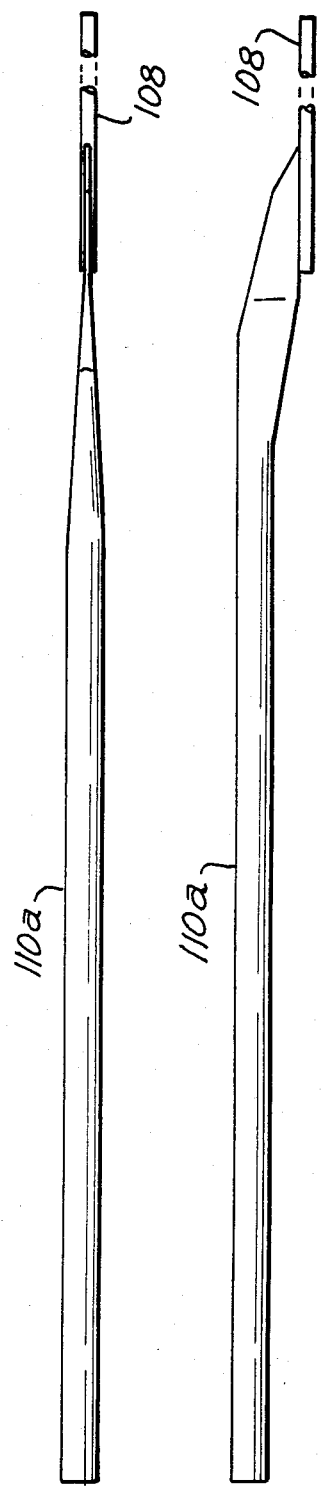
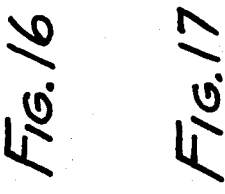
Fig.14
Fig.15
Fig.16
Fig.17

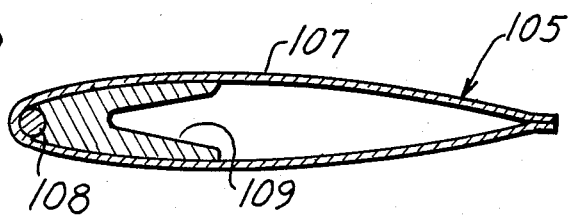
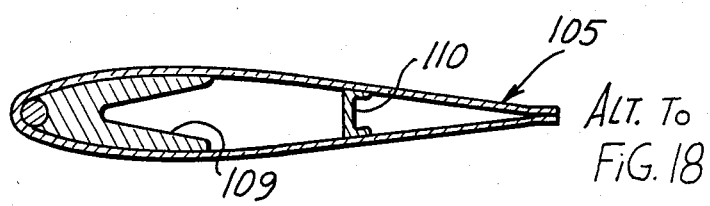
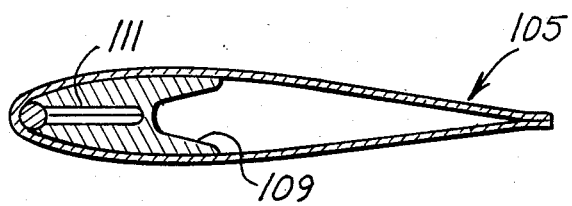
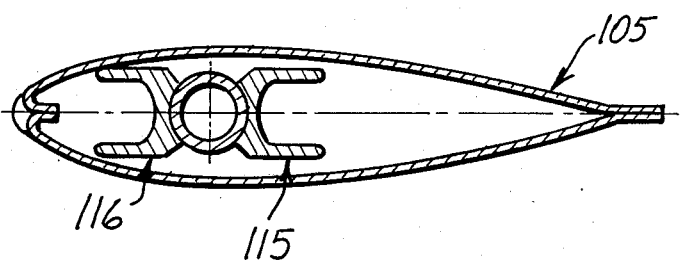
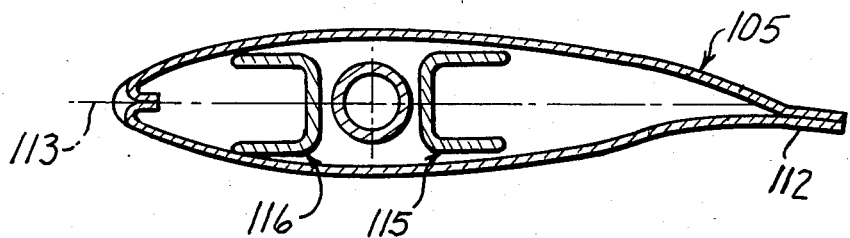

HUBLESS, HINGELESS AND BEARINGLESS HELICOPTER ROTOR SYSTEM

CROSS REFERENCE TO OTHER PATENT APPLICATIONS

This is a continuation-in-part of applicant's co-pending U.S. patent application Ser. No. 340,774, filed Jan. 19, 1982, entitled "Hubless, Hingeless and Bearingless Helicopter Rotor System", now U.S. Pat. No. 4,403,918, issued Sept. 13, 1983, which in turn is a continuation-in-part of applicant's (co-pending as to Ser. No. 340,774) U.S. patent application, Ser. No. 026,653, filed Apr. 23, 1979, entitled Helicopter Rotor Blade and Method for Making the Same", now U.S. Pat. No. 4,316,700, issued Feb. 23, 1982, entitled "Unitary, Bonded-Together Helicopter Rotor Blade".

FIELD OF THE INVENTION

This invention relates to a helicopter rotor system, in particular a rotor system which is hubless, hingeless and bearingless.

BACKGROUND OF THE INVENTION

Helicopter rotor systems constitute a highly developed art. Especially for the larger rotor systems, but also for the smaller, lighter rotor systems, the mounting of the blades for their necessary motions is relatively complicated. Attempts are being made to provide hingeless, hubless and bearingless rotor systems, but these are presently quite complicated and extremely critical in their construction. It is an object of this invention to provide a hubless, hingeless and bearingless rotor system for a light helicopter which can readily be manufactured with the use of conventional fiberglass fabrication techniques and simple, strong and expedient metal components without many of the intermediate elements between the blade and the mast which are common in existing rotor systems.

BRIEF DESCRIPTION OF THE INVENTION

A helicopter rotor system according to this invention includes a rotary mast having an upright axis and a plurality of rotor blades mounted to the rotary mast to be turned directly by the mast. Each blade has a respective longitudinal axis directed away from the mast, the rotor blades all being identical to one another. Each blade cmoprises a skin that forms an airfoil and an internal region. A counterweight rod and a spar extend longitudinally inside this region. The spar comprises a bundle of aligned fibers which, inside the region, are bonded to each other, to the skin, and to the counterweight rod. The bundle as it leaves the spar is divided into two bights each with a bend and a pair of arms, which are bent around respective attachment means that form an extension of the mast. The fibers inside the region constitute continuations of the fibers in the arms and are defined as part of the respective blade. A longitudinally-extending torque tube is rigidly attached to the counterweight rod at a first end of the torque tube, and a first bearing member is provided adjacent to the other end of the torque tube. This bearing member does not react to centrifugal loads, and is bearingless in that sense. It does provide for feathering and flapping movements. The torque tube has an axis. A second bearing member is mounted to the mast and is engaged to the first bearing member, whereby the torque tube is rotatable around its own axis and can move in any angular direction away from its axis around the center of the second bearing means. It can also shift axially when centrifugal loads are applied. This pair of bearing members is not intended to transfer any appreciable centrifugal load from the blade to the mast. Instead, its function is to stabilize the torque tube so it can rotate around its own axis for feathering motion, and angularly in any direction from the torque tube axis, around the center of the first bearing member for lead/lag and flapping motion. Pitch horn means is attached to the torque tube to rotate the torque tube around the axis of the torque tube.

According to a preferred but optional feature of this invention, the attachment means comprises a mounting flange member, which can provide for an initial coning angle and for an initial camber angle, whereby to minimize flexure of the arms in normal operations.

According to yet another preferred but optional feature of the invention, the flexing portions of the arms are disposed outboard from the attachment means, whereby to minimize such flexures as tend to destroy the integrity of the bonded structure.

The above and other features of the invention will be fully understood from the following detailed description and the accompanying drawings, in which:

BRIEF DESCRIPTION OF THE DRAWINGS

FIG. 1 is a partial top view of an embodiment of the invention;

FIG. 2 is a side view partly in cutaway cross-section of the system shown in FIG. 1;

FIGS. 3, 4, 5, 6 and 7 are cross-sections taken at lines 3—3, 4—4, 5—5, 6—6 and 7—7, respectively, in FIG. 1;

FIGS. 11, 12 and 13 are cross-sections taken at lines 11—11, 12—12 and 13—13, respectively, in FIG. 10;

FIG. 14 is a fragmentary plan view showing other features of the embodiment of FIG. 10;

FIG. 15 is a partial view taken at line 15—15 in FIG. 14;

FIGS. 16 and 17 are top and side views, respectively, of the torque tube used in FIGS. 10 and 14; and FIGS. 18–25 are cross-sections taken at lines 18—18, 19—19, 20—20, 21—21, 22—22, 23—23, 24—24 and 25—25, respectively in FIG. 14.

DETAILED DESCRIPTION OF THE INVENTION

Figure 8:
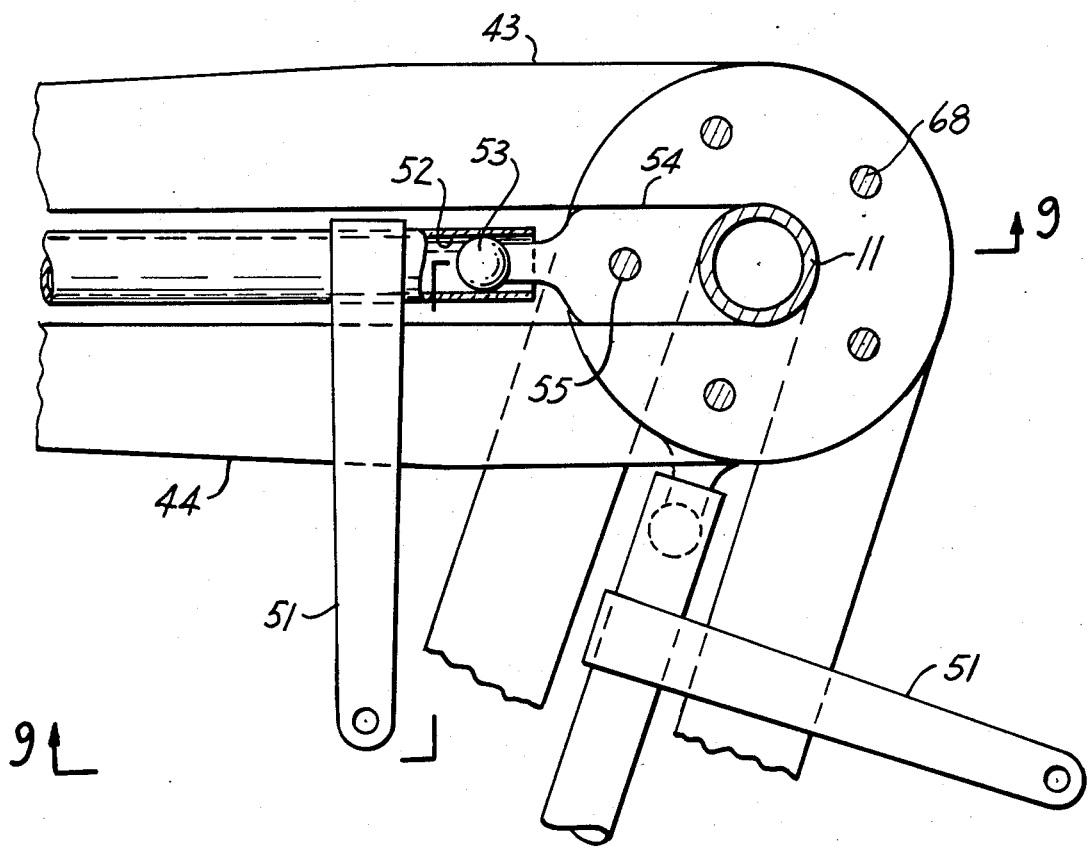
FIG. 8 is an enlarged view of a portion of FIG. 1, partially in cutaway cross-section.
Figure 9:
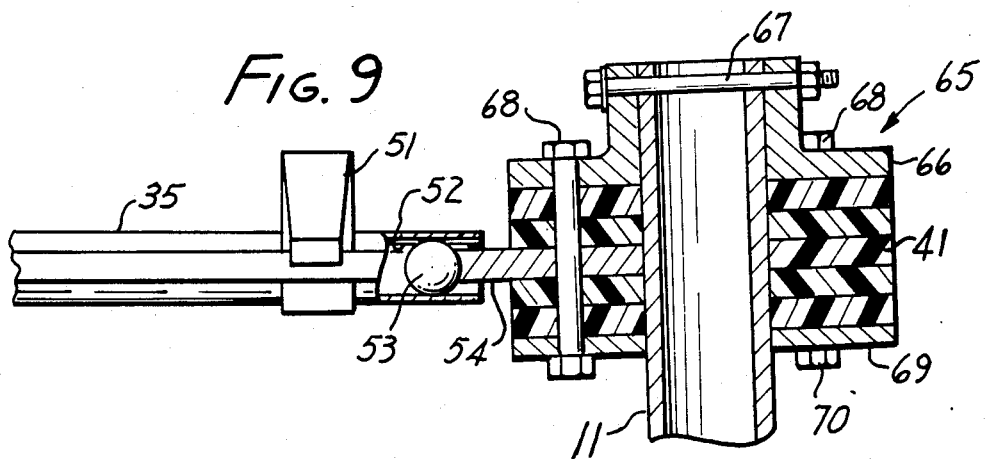
FIG. 9 is a view taken at line 9—9 in FIG. 8.

One embodiment of a helicopter rotor system 10 according to this invention is shown in the Figs. It includes a mast 11 mounted to a fuselage and driven by a fuselage-mounted engine (both not shown). The mast has an upright axis of rotation 12 around which it turns to drive a plurality of rotor blades of which two are shown, blades 13 and 14. In the example shown, five identical and identically mounted blades will be mounted, spaced equally angularly apart from one another around axis 12. Because all of them are identical, only blade 13 will be described in detail.

Especially in FIGS. 1 and 2, the size of the parts near the mast are shown disproportionately large, the blade itself having been reduced in size to fit it on the "sheet".

The airfoil portion 20 of blade 13 is foreshortened in the drawings. It will be made of any appropriate length and dimensions, extending as far to the left as desired, generally shaped to NACA profiles, and is drive by the mast to exert a lifting force on the craft. The airfoil portion and its method of manufacture are shown in detail in said U.S. Pat. No. 4,316,700, all of which is incorporated herein by reference and made a part hereof by reference. It is derived from an application parent to this instant patent application. The airfoil portion includes a skin 21 which is preferably made of a composite material, and shaped to an appropriate configuration. The skin may be made in two parts 22, 23 which can be mirror images of one another when the blade is symmetrical, or can be of different shapes when the blade is asymmetrical. The parts meet at the leading edge 24 and trailing edge 25. Bonding and joinder in this blade can readily be accomplished with adhesives. The trailing edges could be joined together by adhesives or fasteners.

The skin forms an internal region 26 which contains a longitudinally-extending spacer 27 that is U-shaped so that its flanges 28, 29 abut and are fastened to the parts 22, 23 respectively. Inside the region at the leading edge there is a metal counterweight rod 30 which extends parallel to the longitudinal axis 31 of the blade. A spar 32 is formed inside the region. It comprises a plurality of fibers joined together in a bundle by a bonding material to be described, and the skin, the fibers and the counterweight member are all mutually bonded to one another to form a monolithic construction adjacent to the leading edge. The spar is made of bundles of lengths of fibers as will be further described below.

The skin, spar, spacer and counterweight rod are assembled in accordance with the techniques described in more detail in the said U.S. Pat. No. 4,316,700. Persons skilled in the art will recognize that the bundles of fibers can be appropriately formed while the bonding material is still liquid. Instead of building up the airfoil by bonding together a group of prefabricated parts, the skin itself could be used as a mold, and the counterweight rod, fibers and bonding material laid inside the skin, and the skin then closed and held in a fixture so it will have the proper contour during the curing operation. Also, the system can use the well-known "prepreg" process for building up the structure.

At the inboard end of the counterweight member there is attached a torque tube 35 (FIG. 1). This torque tube is a strong metal tube which has a flattened portion 36 that is attached to the counterweight rod by a weldment 37 so that the torque tube can rotate (feather) the airfoil portion around its pitching axis. The fibers which form the spar continue inboard from the airfoil portion to form a bight portion 40. When the airfoil construction is made, the bight portion will be made at the same time, and the spar constitutes an extension of the bight portion itself. The purpose of the bight portion is to mount the airfoil portion directly to the mast so as to transfer the centrifugal load directly to the mast, without the interposition of bearings and clevises as are customarily used in the prior art.

The bight portion includes a flat portion 41 bent around the mast and fitted closely thereto. When this portion is manufactured, tooling pins (not shown) will be inserted so that the fibers do not cut across holes 42 through which bolts will later pass. In the example, because there are five blades there are five such holes.

The bight portion includes a pair of arms 43, 44 which extend from the flat portion toward the airfoil portion, and are progressively shaped at first to provide a pair of channels 45, 46 on opposite sides of the torque tube (FIGS. 4 and 5). The channels are identical so that only channel 45 will be discussed in detail. It has a flat bottom member 47 and a pair of flanges 48, 49. The flanges are directed away from the torque tube, which passes between the channels. These channels progressively change their shape as shown in the drawings and finally merge to form a bundle 50, parts of which pass on each side of the flattened portion of the torque tube and then continue into the region to form the spar.

At least arms 43 and 44 are stiffly flexible, as would be expected of a bundle of glass fibers bonded together. They have substantial tensile strength to resist centrifugal forces, and sufficient flexibility to accommodate feathering, lead/lag and flapping movements.

The torque tube extends inboard toward the mast and has a pitch horn 51 connected thereto. The torque tube of each of the blades will have its own respective pitch horn. The pitch horns are connected to a swash plate (not shown) to control the angle of attack of the blades. Turning the pitch horn will rotate the blade around its axis 31 for feathering motion.

A first bearing member 52 is formed inside the torque tube at its inward end. This bearing member includes a cylindrical passage adapted to receive a second bearing member 53 in the shape of a ball which closely fits inside bearing member 52. Thus the torque tube can be rotated around its own axis, and can be angularly moved in any direction from its axis around the center of bearing member 53. It also has limited freedom for longitudinal movement, as limited by the bight portion and by arms 43 and 44. The torque tube may be constructed of metal, composite, or of graphite fibers as may be desired. The bearing comprising members 52 and 53 is not intended to transfer any appreciable centrifugal load. The centrifugal load is transferred by flat portion 41 which constitutes a flexible continuation of the spar itself. Instead, the bearing acts to stabilize the inboard end of the blade at the torque tube. It enables the blade (and torque tube) to move angularly in any direction from axis 31 of the blade, around bearing member 53 as a center. This enables lead/lag and flapping movement.

Second bearing member 53 is mounted to a mounting plate 54 which fits between the two arms of the bight portion, and has a hole 55 to pass attachment means yet to be described.

As best shown in FIG. 2, a small angle 60 (perhaps 2° up from the horizontal) is formed in the arms in the bight portion to give a built-in coning angle to the structure.

Attachment means 65 is provided to mount the flat portions of the bight portions to the mast. The attachment means includes an upper plate 66 which is attached near the top of the mast and is connected thereto by a cross bolt 67. It behaves as a flange on the mast. Five attachment bolts 68 extend downwardly through holes in a bottom plate 69, below which nuts 70 are applied to compress the flat portions and the mounting plates in a stack and to hold them to the mast. Attachment means 65 comprises plates 66 and 69, and bolts 67 and 68. It will now be seen that upward forces exerted by the blades on the mast when the mast is turned will be exerted through the attachment means, and that centrifugal loads will be transmitted directly to the mast by the bights of the blades.

As to materials of construction, the skin section will usually be of a fiberglass or composite type construction. The fibers will usually be S-glass or some other form of glass fibers, with the correct cross-section area and in a sufficient number to provide the properties required for the blade. The bonding material is preferably an initially liquid, curable resin. Preferably it is a vinyl ester resin rather than a thermal setting epoxy. When fiberglass is used, polyester resin can be used. While polyester resin will mix well, it has relatively poor strength. However, vinyl ester has the strength of epoxy and the workability of polyester. A wet layup procedure can be utilized, which is very convenient. One can squeeze and pat out excess resins to room temperatures while shaping the material to the desired configuration. Instead, a "pre-preg" system can be used, which is well-known in the art. In all of the processes, the bonding material (the resin) fills out the structure to a smooth and continuous configuration by seepage and by abutment with a mold surface, or by mechanical smoothing.

The term "bonding material" is used for the resin, even though it provides much or most of the structure, and the materials in it act primarily as structure elements or reinforcement. However, it does adhere to the other material and joins them to form unitary constructions. For this reason, the term "bonding" is used, although it is not intended to exclude the meaning of "structure". The bonding layers which join the sub-elements may be the same or a different material. Using the same bonding material has the advantage of avoiding points of discontinuity of structural properties. The techniques of constructing the various portions will be understood by persons skilled in the fiberglass and resin epoxy arts and require no further discussion here. However, a more complete disclosure will be found in the aforesaid U.S. Pat. No. 4,316,700.

In order to provide some streamlining for the system inboard of the airfoil portion, a shroud 75 is provided which preferably has an airfoil configuration. It covers most of the bight portion of the blades. It, and the skin in FIGS. 1 and 2, are shown in dashed lines in order to reduce the complexity of the drawings.

It will now be seen that the blades and the bight portions can readily be manufactured, uniformly and quickly, using conventional molds, fixtures, and techniques. After assembly and curing, they can simply be mounted to the mast by the attachment means, and the system is ready to operate.

The system flexes and twists in the arms near the mast. The blade bends to lead and lag primarily just outboard from the point of joinder of the torque tube to the counterweight rod. The bearing means is forgiving of movements in directions lateral to the blade axis (which constitute these motions). Rotating the pitch horn will rotate the blade to vary its angle of attack.

As many or as few blades as necessary will be provided and will be joined in the stack at the mast. Only two are shown for purposes of simplicity of drawings, although in the illustrated example, three more will be provided.

It will thereby be seen that a simple, unitary rotor system is provided which can reliably and readily be manufactured utilizing simple metal forming techniques and fiberglass layup techniques, resulting in a relatively inexpensive blade of a very high quality. The construction provides for all necessary blade motions, without requiring conventional hubs, hinges and bearings.

The blade is in effect a single, monolithic structure without interposition of conventional elements such as clevises and hinges.

The embodiment of FIGS. 10-25 overcomes some of the shortcomings in the embodiment of FIGS. 1-9. Principal among these is the fact that in the embodiment of FIGS. 1-9, the bights of the individual blades must be stacked one atop the other so that the height of the stack at the mast is determined by the number of blades, and this, of course, can limit the number of blades. Furthermore, it would be advantageous to have the mountings of all of the blades in or close to the same plane. This advantage is attained in the embodiment of FIGS. 10-25.

In addition, by utilizing different attachment means for the blades, it is possible to provide camber and coning angles at the attachment means rather than as part of the structure of the blade itself.

It is a further advantage that lead/lag stresses can be taken up in the arms themselves, distant from the attachment means so that there is less tendency to loosening of the fabric arrangement.

This embodiment also provides means for reducing static blade droop, and also means for obtaining more useful lift from the inboard 25% of the rotor blade.

Figure 10:
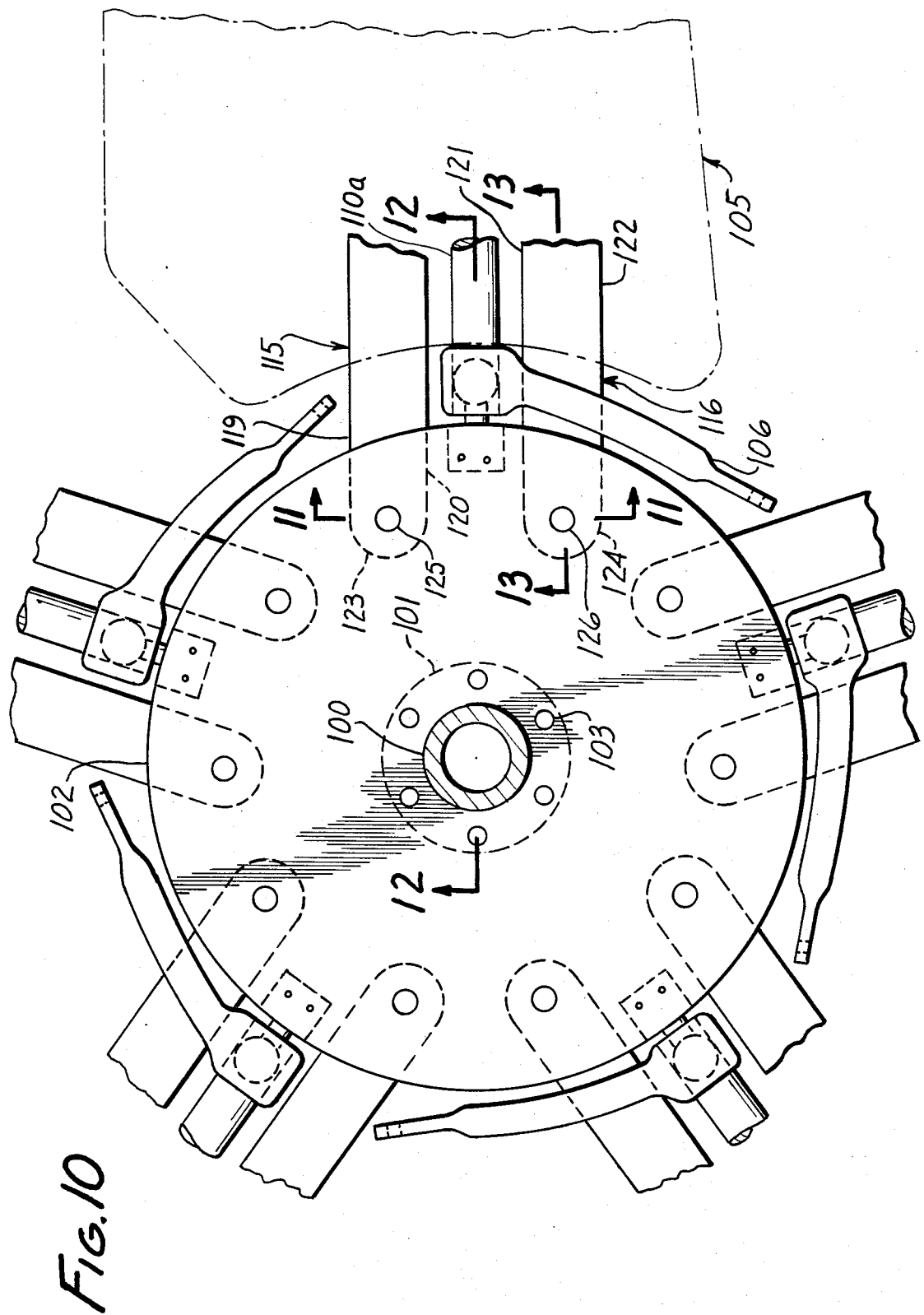
FIG. 10 is a fragmentary plan view showing the presently-preferred embodiment of the invention.
Figure 23:
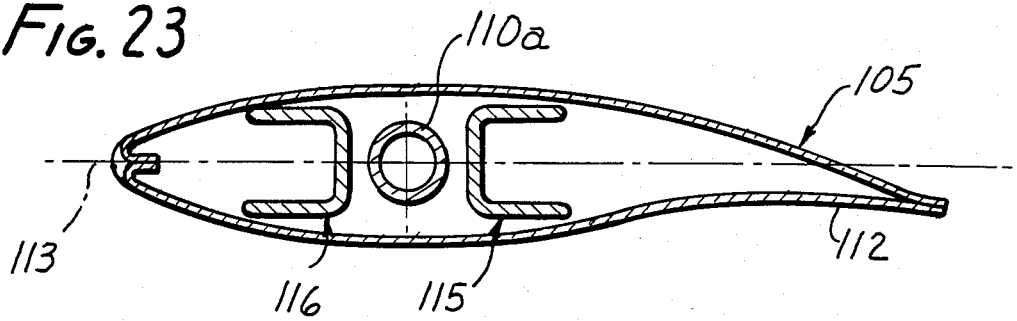

In FIG. 10 there is shown rotor mast 100 which has a flange 101 to which is attached a stack of attachment plates 102. In the illustration, there are eight of these plates in stacks of four each, which are held to the central flange by bolts 103. All of the attachment plates are identical to one another.

The embodiment shows five rotor blades, all of which are identical, so that only rotor blade 105 will be described in detail. Each of them has a similar attachment and a similar pitch horn 106.

The blades are constructed identically to the blades in the FIGS. 1-9, especially in the active region best shown in FIGS. 18 and 19, where the skin 107 is shown wrapped around a counterweight member 108, and spar 109 constructed of fibers and bonding material as aforesaid. An alternate spacer member 110 can be placed between the surfaces of the skin near the trailing edge if desired as in FIG. 19. It is unnecesary to repeat the details of construction of this blade because they have been thoroughly described above. By extending the "wings" of the spar, the skin can be stiffened enough that the spacer member is unnecessary.

A torque tube 110a is attached to the pitch horn. It is also welded to the counterweight member. Turning the pitch horn therefore varies the pitch of the blade.

In FIG. 20, there is shown an optional stiffener member 111 welded to the counterweight member. It extends for a short distance along the counterweight member and is welded thereto.

There is a substantial difference in the blade, as shown progressively from FIGS. 21-25. The skin, it will be noted, begins to have a camber at its trailing end, and as can be seen, the lower rear edge 112 begins to droop farther and farther below the horizontal axis 113. This gives a greater angle of attack, the closer the skin approaches to the horizontal axis 113. This provides an increased angle of attack closer to the mast, which with the enhanced stiffness of the lip will give some lift in this area which usually does not provide any substantial lift. Also, the chord of the blade can increase as it extends toward the mast, also increasing the lift at the inboard section. While the increase might seem small, still in a machine weighing perhaps 2,000 pounds, even 125 pounds of lift can be a considerable assistance and can lift the weight of the blades themselves.

To attain certain of the advantages of this invention, the fibers of the spar are taken from the spar in two bundles instead of one. As before, each bundle 115,116 is doubled so as to form a bight portion 117,118 with a pair of arms 119,120,121,122 and a respective bend 123,124. These bends are wrapped around respective bolts 125,126 on the attachment plates whereby to mount the blade to the mast. The fibers wrapped around the bend return the full length of the blade. Because the fibers are bonded together, and so are the arms, they appear to be simple bundles.

It should be recognized here that the attachment plates are intended to be quite rigid and take no part in flexure or control of the attitude of the blade. They are intended to constitute an extension of the rotor mast and constitute direct attachment means for the blade.

Each blade has a respective counterweight member as aforesaid, which extends to a first bearing member 127 in the nature of a hollow longitudinal tube fitting over a second bearing 128 mounted to the attachment means, i.e., to the attachment plates. This enables longitudinal motion and rotary motion around the center of the ball-like second bearing member as has already been described.

It will now be seen that each blade has two points of attachment to the attachment plates instead of only one, and that it is attached to the plate rather than being directly wrapped around the mast. Therefore, all attachments can be at the same elevation.

Figure 24:
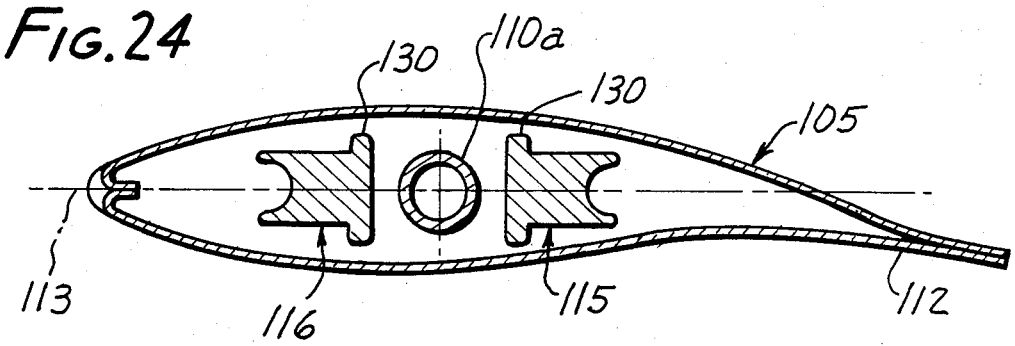
Figure 25:
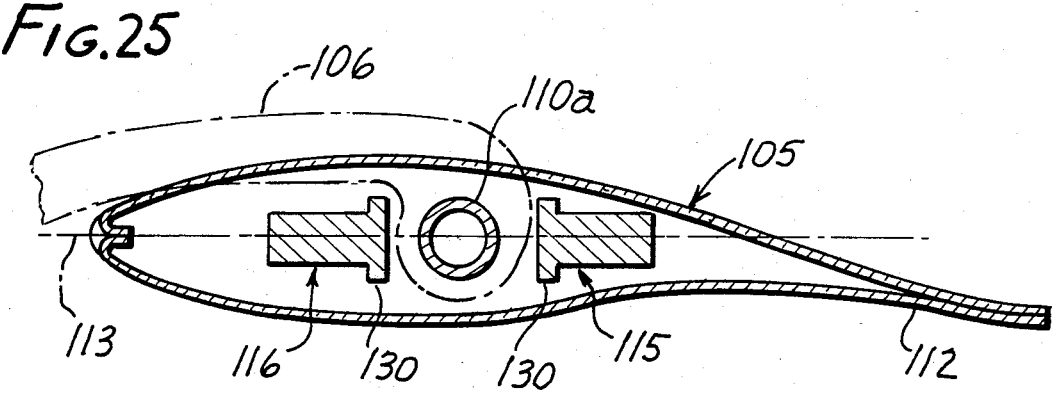

The bundles are shown as they progress from adjacent to the plate, to adjacent to the attachment means in FIGS. 21-25. It will be seen that they progress from a pair of relatively squat, constructions through U-shaped constructions and then to modified hat-shaped constructions, the most significant of which are shown in FIGS. 24 and 25 to include stiffener lip 130, which extends normally to the horizontal axis. It will be appreciated that this can give substantial rigidity against droop. At the bolts, the fibers have been bent to form the bend.

In the use of these blades, it transpires that the lead/-lag effects occur at approximately at sections 20-20 though 22-22. It will be observed that at this point it is quite distant from the attachment means and that there is no discontinuity at this location which could work to destroy or degrade the bonded structure. In conventional structures, attachment means are provided at this location, which is disadvantageous.

The use of attachment plates enables substantial advantages to be attained because these plates can be shaped to provide various angles. For example, in FIG. 12 the plates are shown with a coning angle 131 stamped into them at the center so as to reduce the excursion required of the bight itself to achieve this angle. Similarly, the plates can be stamped with a pair of joggles, 132,133 to establish a positive basic pitch angle for the blades with the same objective and advantage. Thus, by merely shaping the plates, it is possible to reduce cyclic stresses on the blades themselves.

Again, it is emphasized that the attachment plates form merely an extension of the mast itself and take no part in the flexure of the blades during operation, neither as to feathering, nor flapping, nor lead/lag motion.

Another advantage of this class of blade is that wider cross-sections of the blade chord can be provided at its root than at its tip so as to take greater advantage of the inboard portion of the blade, and that the total cross-section of the fibers is constant throughout the entire blade and its attachment, thereby avoiding discontinuities of transition points between the various shapes. This is a tremendous assistance in lay up of the device in manufacture.

Although each blade is attached at two points instead of one, it is hubless in the same sense as the embodiment of FIGS. 1-9. A rotor hub is a mechanism which provides not only for retention of the blade, but also for movement of the blade lead/lag, flapping and feathering modes.

Because the attachment plates do not provide for any of this, they are hubless in the same sense as before.

This invention is not to be limited by the embodiments shown in the drawings and described in the description, which are given by way of example and not of limitation, but only in accordance with the scope of the appended claims.

I claim:

1. A helicopter rotor system comprising:

a rotary mast having an upright axis;

three or more rotor blades mounted to said rotary mast to be turned by said mast, each said blade having a respective longitudinal axis directed away from said mast, all of said rotor blades being substantially identical to one another, and being angularly spaced apart around said mast, each said blade comprising a skin forming an airfoil and an internal region, a counterweight rod and a spar extending longitudinally inside said region, said spar comprising a bundle of aligned fibers which, inside said region are bonded to each other, to said skin, and to said counterweight rod, said bundle being doubled and divided so as to form inboard of said skin a pair of U-shaped bight portions, each with a bend and a pair of arms, said arms being stiffly flexible, said fibers inside said region constituting continuations of the fibers in said bight portions, said fibers in bight portions being bonded together, whereby the total cross-section area of said fibers is substantially constant from the inboard end of said arms through the major portion of the length of the spar;

attachment means attaching each of said bight portions to said mast at locations spaced apart from one another and substantially spaced from the center of said shaft, both on the same side of the center of the mast;

a longitudinally-extending torque tube rigidly attached to said counterweight rod at a first end of each said torque tube, and a first bearing member adjacent to the other end of said torque tube, said torque tube having an axis; and a second bearing member mounted to said attachment means and to said first bearing member, whereby said torque tube is rotatable around its own axis, and can move in any angular direction away from said longitudinal axis around the center of said second bearing means, whereby to enable lead/lag, feathering and flapping movements.

2. A helicopter rotor system according to claim 1 in which said attachment means comprises a substantially rigid flange on said mast, each said bight being attached at its bend to said flange.

3. A helicopter system according to claim 2 in which said attachment means includes bolt means around which extends around a respective said bolt means.

4. A helicopter system according to claim 3 in which said flange is formed to mount the bight portion at an initial coning angle.

5. A helicopter system according to claim 3 in which said flange is formed to mount the bight portion at an initial camber angle.

6. A helicopter system according to claim 5 in which said flange is formed to mount the bight portion at an initial coning angle.

7. A helicopter system according to claim 2 in which said flange comprises a plurality of plates rigidly mounted to said shaft, one on each side of the bend, whereby to sandwich at least part of the bend between them.

8. A helicopter system according to claim 7 in which said plates have aligned apertures to pass bolts through them and through the bight portion inside the bend to attach the blade to said plates.

9. A helicopter system according to claim 8 in which said plates are formed to mount the bight portion at an initial coning angle.

10. A helicopter system according to claim 8 in which said plates are formed to mount the bight portion at an initial camber angle.

11. A helicopter system according to claim 10 in which said plates are formed to mount the bight portion at an initial coning angle.

12. A helicopter system according to claim 7 in which each of said pluralities comprises a stack of similar plates.

13. A helicopter system according to claim 1 in which said arms are shaped to form a stiffener lip extending generally upwardly for at least part of their length to resist static droop of the blade.

14. A helicopter system according to claim 1 in which the major portion of flexure in lead/lag motion occurs at a substantial distance from the point of attachment of the bight portion to the mast, between said attachment means and said spar.

15. A helicopter system according to claim 1 in which the length of the forwardly extending chord of the blade lengthens as it approaches the bight portion.

16. A helicopter system according to claim 1 in which a substantial skin area enfolds the bight portion, out of contact therewith.

17. A helicopter rotor system according to claim 1 in which said skin has a camber in a region adjacent to the end of the rotor blade having said bights, which camber increases as it approaches said end.

18. A helicopter rotor system according to claim 1 in which the number of said blades is an odd number.

19. A helicopter rotor system according to claim 1 in which pitch horn means is attached to each torque tube to rotate said torque tube around the axis of said torque tube.

* * * * *